UNITED STATES PATENT OFFICE.

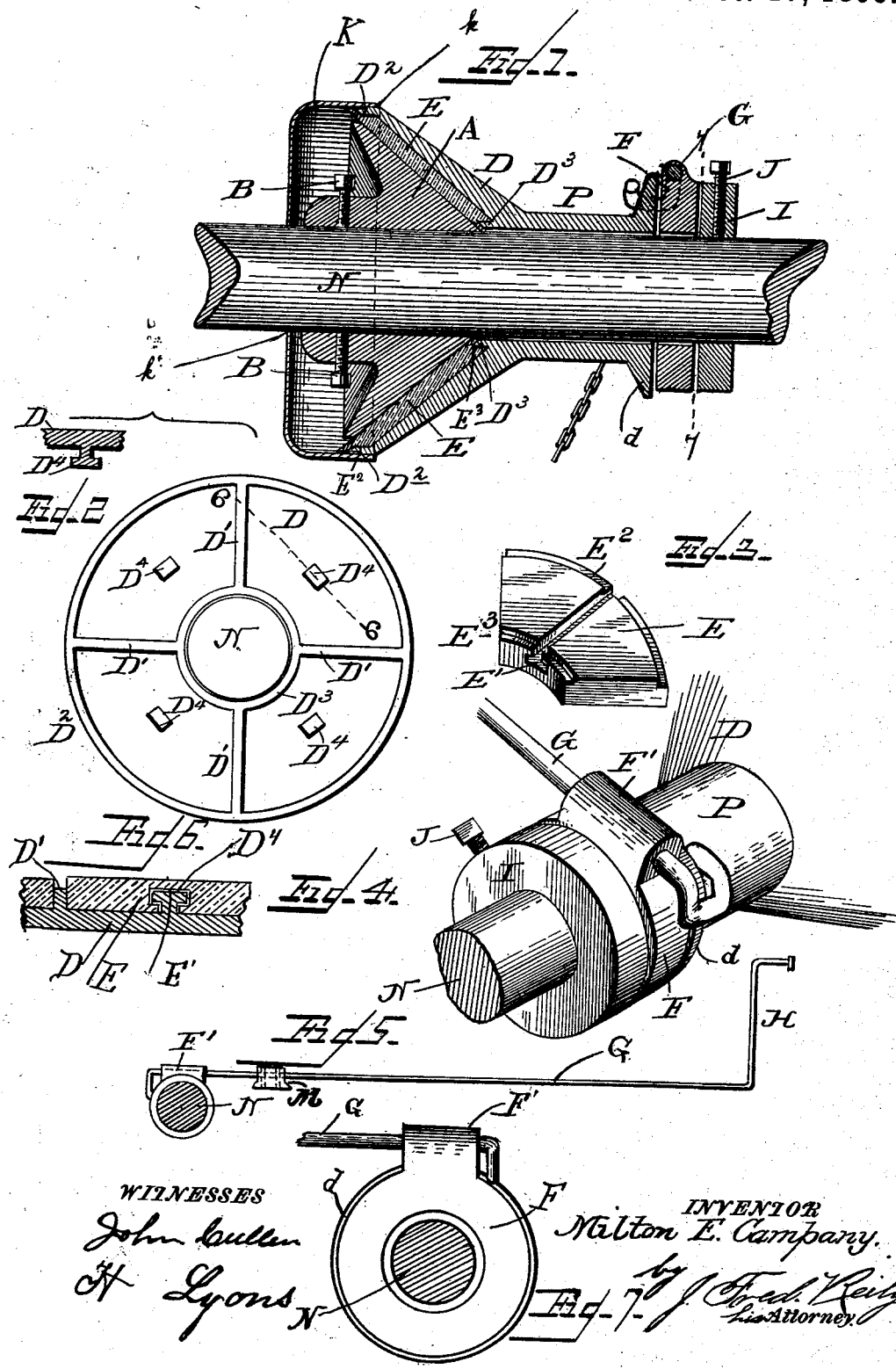

MILTON E. CAMPANY, OF HAMILTON, ASSIGNOR OF ONE-HALF TO HORACE B. PECK, OF KALAMAZOO, MICHIGAN.

FRICTION-CLUTCH.

SPECIFICATION forming part of Letters Patent No. 506,767, dated October 17, 1893.

Application filed November 14, 1892. Serial No. 451,952. (No model.)

*To all whom it may concern:*

Be it known that I, MILTON E. CAMPANY, a citizen of the United States, residing at Hamilton, in the county of Allegan and State of Michigan, have invented certain new and useful Improvements in Friction-Clutches; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention consists in a new and improved friction clutch, which is adapted to be used on revolving shafts, or axles, of all kinds; and my invention will be hereinafter fully described and claimed.

Referring to the accompanying drawings: Figure 1 is a central sectional view of my new and improved friction clutch. Fig. 2 illustrates in detail the loose clutch-section. Fig. 3 is a detail view of one of the packing-sections straightened out so as to lie in a plane. Fig. 4 is a perspective side view, partly in section, of my invention. Fig. 5 is a side view of the shifting rod. Fig. 6 is a sectional detail view taken on the plane indicated by line 6—6, Fig. 2, with the parts straightened out, and with the packing in position. Fig. 7 is a detail view taken on the plane indicated by line 7—7, Fig. 1.

The same letters of reference indicate corresponding parts in the several figures.

In the accompanying drawings A represents a fixed conical clutch-section, which is secured upon a shaft, or axle, as N, by means of set-screws B, B, or in any other desired manner.

D indicates the loose conical clutch sleeve, which is loosely mounted upon the shaft, and is formed with a drum P, upon which is secured and wound a chain running to the brake-lever when my clutch is used on an axle to apply the brakes on a rail-road car or other vehicle; which is one of the purposes to which it is adapted to be applied.

The inner face or side of the loose cone D is formed with four radial ribs, D', and with the outer and inner annular shoulders $D^2$, $D^3$; and midway between the radial ribs is formed with the locking-lugs, $D^4$, having the square heads.

E indicates the packing sections or segments, which are formed of compressed paper or composition, being formed with the annular shoulders $E^2$ and $E^3$ at their upper and lower ends, to adapt them to fit the shoulders $D^2$ and $D^3$, as shown, while their inner sides are formed with the locking-grooves E', nearly T-shaped in cross section, in which the locking-lugs $D^4$ fit. It will be seen that the packing will thus be locked firmly and securely in position against all lateral pull or twist; the radial ribs D' assisting in holding the packing in position against all lateral strain or twist. The thickness of the packing-segment is, as shown, greater than the height of the radial ribs or of the locking lugs, so that the ribs and lugs cannot possibly come in contact with the hardened iron or steel face of the fixed cone A.

G indicates a cranked shaft which is turned by means of its cranked outer end, H, to bring the loose clutch-sleeve in contact with the fixed cone A; this shaft or rod, a side view of which is given in Fig. 5, being mounted loosely in a fixed bearing, M, near its outer end, and at its inner end is mounted in a bearing F' formed on the top of a collar F which is loosely mounted on the shaft, N, at the outer end of the loose clutch-section. A collar I, which is held in place by a set-screw, J, limits the movement of the loose collar, as shown.

The free inner end of the shaft G is formed into a double cam, or U-shape, as shown in the drawings, to adapt it to fit on both sides of an annular flange, d, formed on the outer end of the loose clutch-section; so that when the outer end of the shaft G is turned in one direction its inner end will slide the loose cone D up against the fixed cone, A, and when turned in the other direction will slide the loose cone away from the fixed cone, as will be readily seen. It will now be seen that by turning the outer end of shaft G in the proper direction that the loose pulley or clutch-section D will be thrown against the fixed revolving cone D with more or less force according to the pressure exerted at the outer end of the shaft, thus causing the loose pulley (the packing on the inner face of which gives a firm grip on the fixed pulley) to be revolved by the fixed cone; the shaft G turning easily in the fixed bearing M and in the inner bearing F' on the collar F, which of course must be loose on the revolving shaft, while its U-shaped inner end, fitting on both sides of the outwardly extending flange $d$, will, as it turns to either side, readily and instantly slide the loose clutch-section D in either direction on the shaft, as may be desired. The loose cone D will, as before stated, revolve with more or less speed according to the force with which it is pressed against the fixed cone A by the shaft G, and when used for that purpose can be made to wind up the brake-chain and apply the brakes with greater or less force, and when the chain has been wound to a certain tension the face of pulley D will slip upon the face of the fixed pulley, thus preventing the breakage of the brake-chain by the application of too much tension or strain.

K indicates a curved metal cap, the edge, $k$, of which fits tightly upon the outer edge or end of the loose cone, as shown; this end of the loose cone being slightly larger than the fixed cone; and it will be seen that this close fitting cap, which has a central opening, $k'$, through which the shaft, N, passes, will effectually prevent the entrance of all dirt, dust, water, or anything else which might injure the faces of the cone-pulleys: and this protective cap is easily removed when desired by pushing it back on the shaft away from the loose pulley.

When the compressed paper or composition packing segments of the loose pulley wear out, the set-screw J is loosened and the fixed collar I slid back on the shaft as far as desired, and the loose collar F and the loose pulley D are then slid back until convenient access can be had to the face of the loose pulley, when the worn packing-segments are removed, and readily replaced by the new ones, which are easily slipped in place, where they are firmly and most securely held, against all side or lateral and other strain by the square-headed locking-lugs $D^4$ fitting in their longitudinal grooves $E'$, the annular shoulders $D^2$ and $D^3$, and the radial ribs $D'$.

Having thus described my invention, what I claim, and desire to secure by Letters Patent, is—

1. A friction clutch consisting of the fixed cone A, the longitudinally movable loosely mounted conical section D having its inner face provided with radial ribs and headed locking projections, arranged in the spaces between said radial ribs and packing-sections fitting between said radial ribs having recesses formed in their inner sides and adapted to be engaged by said headed locking projections; substantially as set forth.

2. In a friction clutch, the combination of the fixed cone, A, the longitudinally movable loosely mounted conical section having the outwardly-projecting annular flange $d$ at its outer end, the stationary collar I, the loose collar F arranged on the shaft between said stationary collar and the loose clutch-section and having the bearing F', and the cranked rod G mounted in a fixed bearing, M, and the bearing F' and having the U-shaped inner end engaging with the clutch-flange $d$, substantially as and for the purposes set forth.

3. A friction-clutch consisting of the loose cone A, the longitudinally-movable loosely mounted conical section D having its inner face provided with the radial ribs $D'$ and the square-headed locking-lugs $D^4$, and the packing segments fitting between said radial ribs and formed with the locking grooves $E'$ adapted to receive said lugs; substantially as set forth.

4. A friction clutch consisting of the fixed cone A, the longitudinally movable loosely mounted conical section D having its inner face provided with the radial ribs $D'$, the outer and inner annular shoulders $D^2$, $D^3$, and the square-headed locking-lugs $D^4$, and the packing-segments fitting between said ribs and formed with the end-shoulders $E^2$ and $E^3$ and the locking-grooves $E'$; substantially as set forth.

5. The combination, with the fixed cone A and the loosely mounted, longitudinally-movable, conical section D, of the protective cap K, having the central shaft-opening $k'$ and fitting tightly at its edge, $k$, upon the outer end of the loose cone D; substantially as set forth.

In testimony whereof I affix my signature in presence of two witnesses.

MILTON E. CAMPANY.

Witnesses:
H. A. SEARS,
BEN SEARS.